UNITED STATES PATENT OFFICE.

MAURICE HERISSON, OF PARIS, FRANCE, ASSIGNOR OF ONE-HALF TO JOHN FERREOL MÖNNOT, OF NEW YORK, N. Y.

PAINT AND PIGMENT.

992,355.  Specification of Letters Patent.  Patented May 16, 1911.

No Drawing.    Application filed November 6, 1907.   Serial No. 400,907.

*To all whom it may concern:*

Be it known that I, MAURICE HÉRISSON, a citizen of the Republic of France, residing in Paris, in the Republic of France, (whose post-office address is 8 Rue de Sentier, Paris, France,) have invented certain new and useful Improvements in Paints and Pigments; and I do hereby declare the following to be a full, clear, and exact description of the same, such as will enable others skilled in the art to which this invention appertains to practice and use the same.

This invention relates to paints and pigments; and comprises a paint or pigment comprising a precipitated reactive silicate of barium in combination with other paint forming bodies; all as more fully hereinafter set forth and as claimed.

White lead is probably the best of ordinary white pigments and in combination with linseed oil it forms a paint of great durability and spreading power, which, however, is not permanent in the presence of acid gases and sulfur compounds. Linseed oil in drying becomes more or less porous and opens up avenues of communication for such gases with the sensitive lead carbonate of the lead paint. Zinc white, though more permanent does not form the intimate union with the oil which characterizes the lead paints and after the oil dries the particles of dried oil and the particles of pigment tend to separate more or less after a time. The union of pigment and vehicle seems to be merely a mechanical mixture. Nor does the zinc white paint spread well. The lithopones, which consist substantially of a mixture of barium sulfate and zinc sulfid in various proportions form paints which spread well and are tolerably good, but after a time the zinc sulfid is apt to oxidize more or less to zinc sulfate with the air entering through the pores of the dried oil, and, in exposed places, to wash out, leaving a loose, very porous paint.

It is the object of the present invention to produce a pigment which while entering into intimate union with the linseed oil, in case that vehicle is used, nevertheless forms an absolutely permanent paint, not suffering from contact with air, acid gases or sulfur compounds, forming a paint which spreads well, flows freely from the brush and is durable. To this end a pigment is produced which comprises a hydrated, precipitated silicate of barium of certain characteristics in combination with certain other pigment and paint forming bodies, said silicate having been partially dehydrated at a low temperature but still retaining sufficient water of constitution to enable it to be chemically reactive.

Upon admixture of a solution of a suitable soluble salt of barium, such as the chlorid, with a soluble silicate, also in solution, a precipitate of hydrated silicate of barium falls in a hydrated condition. Since the ordinary silicate of sodium, or "water glass," found in commerce contains an excess of silica, chemically considered, the precipitate is usually supersilicated also; that is, it contains more silica than is equivalent to the barium, chemically considered. The precipitate being hydrated and containing a strong base, baryta, is chemically very reactive, and it does not lose this reactivity upon careful drying short of dehydration. In drying to remove mechanically admixed moisture, care must be taken not to remove too much of the chemically combined moisture as this would result in a loss of reactivity and make the silicate chemically inert. Low temperature drying is therefore necessary. When separated from the mother liquor, and so dried it may be used as a pigment directly, being white in color and very fine in texture. With careful drying it retains the almost molecular state of subdivision of the original precipitate. In combination with linseed oil in the condition in which it is left by such drying, it forms more or less barium soap, a highly insoluble white body, with separation of white hydrated silica in a hard, physically durable, chemically reactive form. A paint of this character therefore hardens chemically in addition to the ordinary hardening by oxidation of the linseed oil. With other vehicles it also exhibits similar chemical hardening properties. With casein, for instance, it forms barium caseinate with separation of silica. With any of these paints compounded with the partially dehydrated barium silicate, exposure to air, as on a coated surface, results in a gradual increase of hardness since carbon dioxid in penetrating the coating gradually converts more or less of the baryta into the hard carbonate with separation of the silica in a hard hydrated or "opaline" form. In making composite paints, this highly reactive silicate of barium frequently enters into useful reactions with other pigments. On grinding the silicate with zinc white, for instance, white silicate of zinc is formed to a large extent at the expense of the excess of silica of the barium silicate, leaving the latter in a still more reactive form, barium silicate without an excess of silica being still more active as a saponifying agent for the oil than is the supersilicated silicate usually formed in the precipitation. For this use however, as for others, it is necessary that the barium silicate shall not have been dried to complete dehydration as it is not particularly reactive when anhydrous. Other silicates can be advantageously combined with the silicate of barium, as, for instance, silicate of aluminum. These two silicates in a hydrated form readily react to form double silicates and such double silicates are very desirable components of paints since they possess many of the advantages of the simple barium silicate and also others.

In making the described pigments, 148 kilos of a solution of barium chlorid of about 18° Baumé strength may first be mixed with 193 kilos of a solution of ordinary water glass at a strength of about 25° Baumé. This results in the formation of a precipitate of barium silicate which may be removed, washed and dried, the drying being carried to about 50 per cent. of hydration. Ordinary air may be used for drying in summer, but in winter hot air should be employed. Where it is desired to form the double silicate directly, while the barium silicate is still in the wet condition, the more or less washed original precipitate may have added to it, first, a solution of aluminum sulfate, 126 kilos of an 18° Baumé strength being a suitable amount for the described amount of material, and, second, 177 kilos of a 25° Baumé solution of silicate of soda. This results in a precipitate of aluminum silicate in the hydrated form which immediately combines with the barium silicate to form a compound something like that in ordinary cements (double silicate of aluminum and lime). The silicate in the vessel in which the operation is performed will contain more or less barium sulfate, and particularly if the contact of the aluminum sulfate solution with the first precipitate of barium silicate be prolonged before addition of the second portion of waterglass solution, but this does no great harm beyond diminishing proportionately the amount of barium silicate, barium sulfate being a good white pigment. The precipitate of double silicate is removed from the solution of sodium sulfate formed in the second operation, or the solution is decanted off, and it is washed and dried in any suitable apparatus, care being taken not to make it anhydrous, the drying being preferably so conducted as to leave about 45 to 50 per cent. of hydration. The dry double silicate so formed and still containing water of hydration is nearly as reactive as the original hydrated barium silicate, reacting readily with other pigments and vehicles in the manner described, and it is of a chemical and physical consistence eminently adapting it for use as a pigment in paints. It is particularly desirable for use with zinc white, with which it possibly forms a triple silicate. An exceptionally good white paint may be made by grinding 45 per cent. of the dried double silicate with 25 per cent. of linseed oil and 30 per cent. of zinc white, the grinding being preferably prolonged. The longer the duration of the grinding, the greater is the reaction between the double silicate and the zinc white and oil, and the better is the paint. The malaxation is preferably continued for at least three hours and it is better five or six hours.

Instead of directly making the double silicate in the manner described the single hydrated silicates may be singly made and combined together in the oil, this operation frequently proving more convenient. For this purpose the dried, partially dehydrated barium silicate may be made as described from 148 kilos of 18° Baumé barium chlorid and 193 kilos 25° sodium silicate solution. In another vessel, a simple hydrated aluminum silicate may be made from 126 kilos of 18° Baumé aluminum sulfate solution and 177 kilos of 25° Baumé sodium silicate solution. The two precipitates are separately washed and partially dried in the manner described and are then ground together in the oil.

A good paint may be made from 17 per cent. of the dried partially dehydrated barium silicate; 28 per cent. of dried partially dehydrated aluminum silicate; 30 per cent. of zinc white and 25 per cent. of linseed oil; all fine ground together. Another may be made from 36 per cent. of the double silicate (10 per cent. barium silicate and 26 per cent. aluminum silicate), 40 per cent. of zinc white and 24 per cent. of linseed oil.

Paints prepared as described may be used on any ground, even plaster or cement. On plaster, the sulfate of calcium and the barium silicate react more or less at the line of union between ground and coating, producing a hard and cohering linking layer, while the excess of silica in the paint combines with any excess of lime which may be in the plaster or cement, preventing such lime attacking the oil. This is quite an important point, it being difficult to use the common types of oil paint upon cement and plaster surfaces. The silica deposited in the paint after exposure to air is white and of great hardness, and of a consistency which contributes materially to the texture and durability of the paint.

Any fillers, such as kaolin, infusorial earth, barium sulfate and like white pigments may of course be admixed with the paint or pigment. Color-giving pigments may also be admixed where other colors than white are required. Suitable lake-forming dyestuffs may be co-precipitated or incorporated with either the hydrated barium silicate or the hydrated aluminum silicate, or both, to produce tinted paints.

The pigment will withstand mixture with calcimine vehicles, size and fresco grounds. It may be employed as a paper filler or as a size.

What I claim is:—

1. As a new composition of matter, a composition of a reactive precipitated partially dehydrated silicate of barium with other paint-forming substances, said silicate still retaining sufficient water of constitution to render it chemically active and being in its original state of fine subdivision.

2. As a new composition of matter, a composition comprising a hydrated precipitated reactive silicate of barium and a hydrated precipitated silicate of aluminum, said silicates having been partially dehydrated but being in their original state of fine subdivision.

3. As a new composition of matter, a composition comprising a hydrated precipitated reactive silicate of barium, a hydrated precipitated silicate of aluminum and other paint-forming substances, said silicates having been partially dehydrated, but being in their original state of fine subdivision.

4. As a new composition of matter, a composition comprising a hydrated precipitated reactive silicate of barium, a hydrated precipitated silicate of aluminum, and zinc white, said silicates having been partially dehydrated but being in their original state of fine subdivision.

5. As a new composition of matter, a composition comprising a hydrated precipitated reactive silicate of barium, a hydrated precipitated silicate of aluminum, zinc white and a paint-vehicle, said silicate of barium having been partially dehydrated but being in its original state of fine subdivision.

6. As a new composition of matter, a composition comprising a hydrated precipitated reactive silicate of barium, a hydrated precipitated silicate of aluminum, zinc white and linseed oil, said silicate of barium having been partially dehydrated but being in its original state of fine subdivision.

7. As a new composition of matter, a composition comprising a dry, partially dehydrated precipitated reactive silicate of barium and a dry, partially dehydrated precipitated silicate of aluminum, said silicate of barium having been partially dehydrated but being in its original state of fine subdivision.

8. As a new composition of manufacture, a composition comprising coprecipitated silicate of barium and silicate of aluminum, said coprecipitated silicates being dry, partially dehydrated but still retaining water of constitution and being of a reactive nature and in their original state of fine subdivision.

In testimony whereof, I affix my signature in the presence of two witnesses.

MAURICE HÈRISSON.

Witnesses:
J. B. MONNOT,
H. C. COXE.